Aug. 25, 1964   G. CAVRICH   3,145,989
SPREADING MACHINE FOR FABRIC-LIKE SHEET MATERIALS
Filed Aug. 17, 1962   10 Sheets-Sheet 1

George Cavrich, Inventor

Attorney

Aug. 25, 1964  G. CAVRICH  3,145,989
SPREADING MACHINE FOR FABRIC-LIKE SHEET MATERIALS
Filed Aug. 17, 1962  10 Sheets-Sheet 5

George Cavrich, Inventor

Attorney

Aug. 25, 1964  G. CAVRICH  3,145,989
SPREADING MACHINE FOR FABRIC-LIKE SHEET MATERIALS
Filed Aug. 17, 1962  10 Sheets-Sheet 6

George Cavrich, Inventor

Richard L. Cannaday
Attorney

George Cavrich, Inventor

Attorney

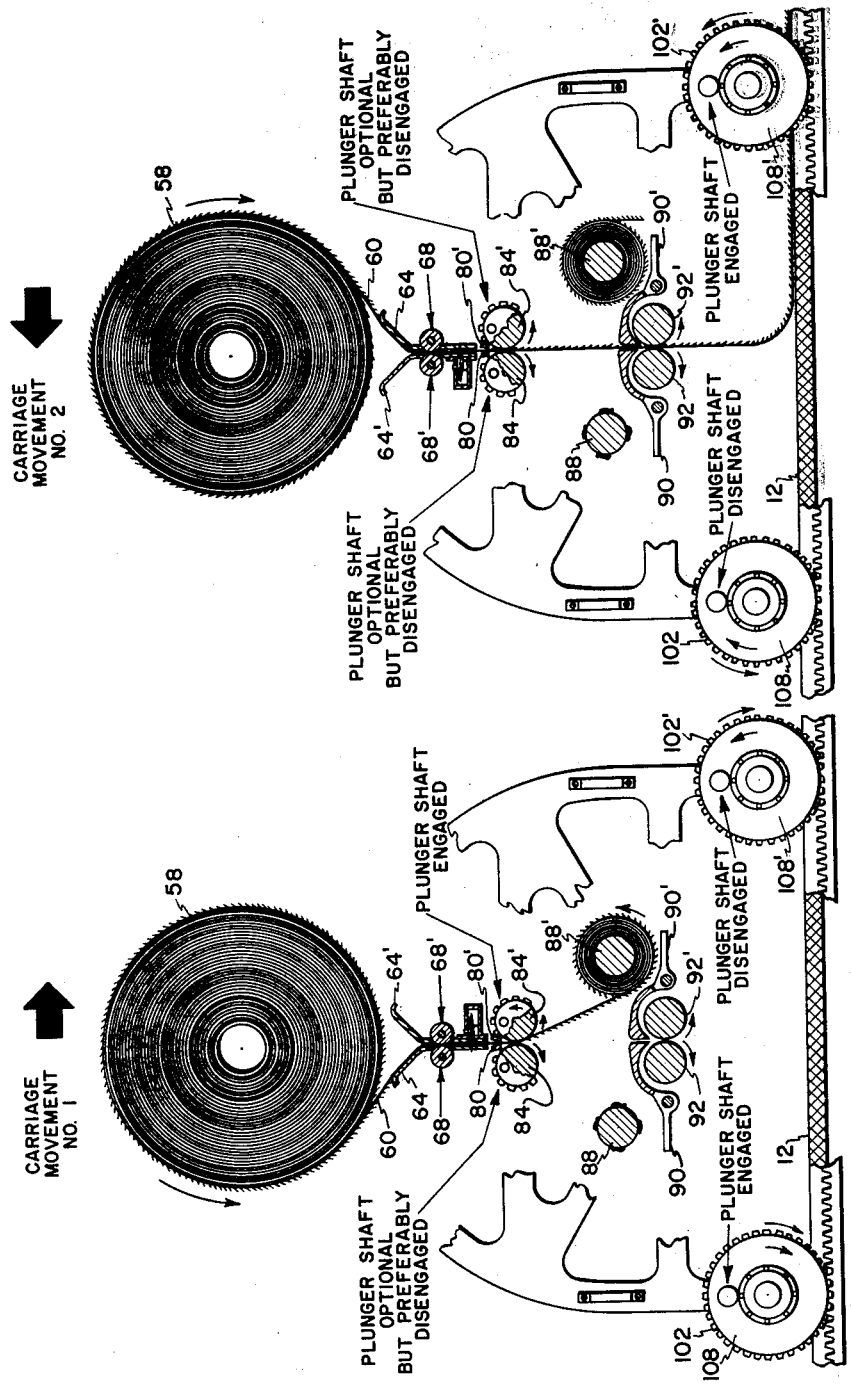

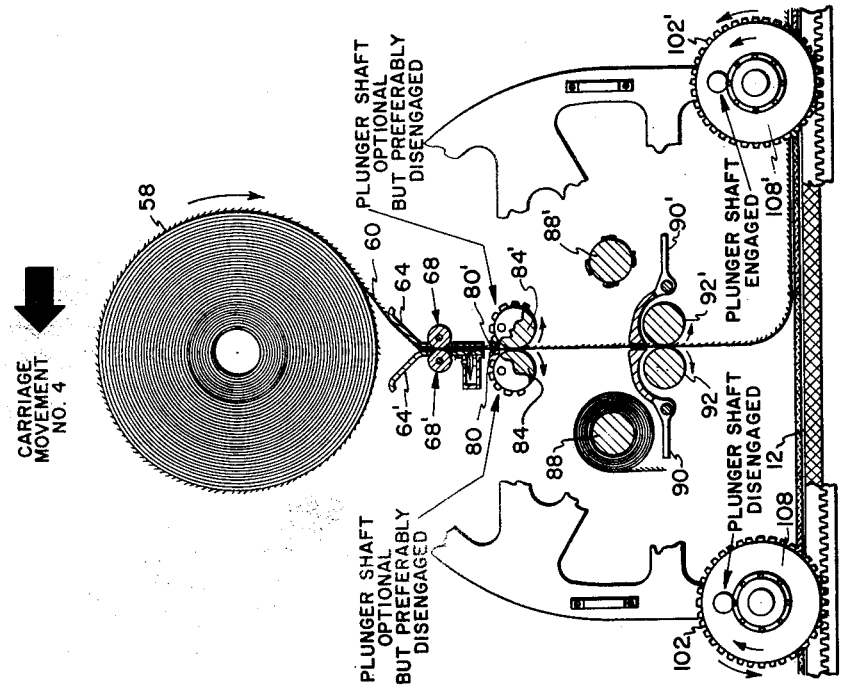
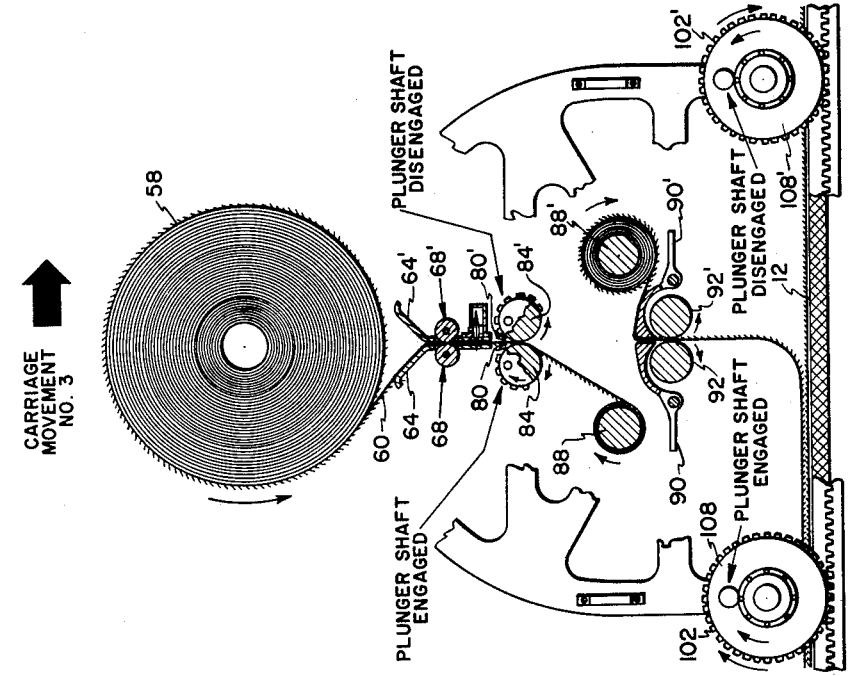

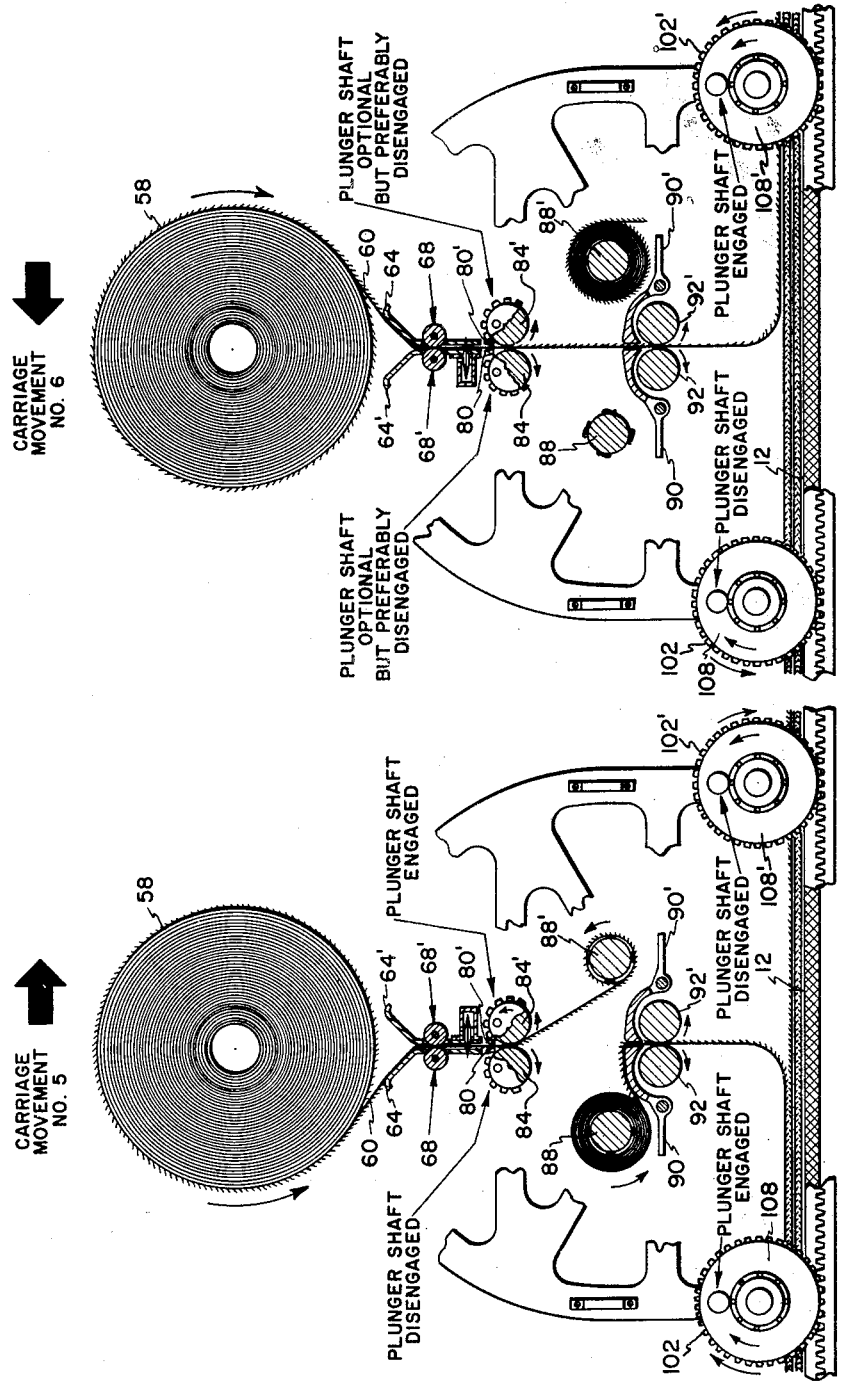

United States Patent Office 3,145,989
Patented Aug. 25, 1964

3,145,989
SPREADING MACHINE FOR FABRIC-LIKE SHEET MATERIALS
George Cavrich, 310 Riverside Drive, New York 25, N.Y., assignor, by direct and mesne assignments, of one-half percent to Stanley O. Morss, Metuchen, N.J.
Filed Aug. 17, 1962, Ser. No. 217,650
9 Claims. (Cl. 270—31)

This invention relates to a machine for spreading sheet materials upon a surface to produce multiple, superimposed pairs of face-to-face sheets in a position for further processing, as, for instance, for the cutting of matched pieces or segments of the same. In particular, this invention relates to a novel spreading machine adapted for spreading cloth or like sheet material under conditions where the material to be spread must be laid down with successive layers thereof having their nap, or pattern, or other property in a predetermined relationship from layer to layer which does not permit the sheet material to be folded back and forth in the production of multiple layers. More particularly, this invention relates to a machine adapted for the spreading of a sheet segment in each of two opposing directions of travel of the machine so as to lay down a nap-bearing material in pairs of superimposed layers disposed to admit of in situ cutting of pieces therefrom in matched pairs.

A typical cloth-laying or cloth-spreading machine known to the prior art includes a frame structure disposed to perform reciprocating motion between the ends of a cutting table, and means on the frame for supporting a roll of cloth and for running the cloth out along the table as the frame structure travels from end to end thereof. Where the necessity for cutting pieces in matched pairs from a napped or patterned material is not present, these machines conventionally provide for a spreading or laying down operation on each traverse or trip along the table with the sheet material being folded at the end of each traverse. Additionally, cloth spreading machines are known to the art which can be used to spread napped material so as to admit of the cutting of pieces therefrom in matched pairs. However, the latter machines are characterized by being limited to spreading on only alternate traverses, that is, in only one direction of their travel along the cutting tables on which they are mounted. Thus, the prior art machines which provide spreading in both directions of travel are not adapted for the spreading of napped material in a manner admitting of in situ cutting therefrom of pieces in matched pairs, while on the other hand those that do spread in a manner admitting of such cutting are not capable of spreading or laying down material in both directions of their travel.

It is a principal object of this invention to provide a spreading machine having the advantageous features of both of the aforementioned machines or classes of machines of the prior art; that is, it is a principal object of this invention to provide a spreading machine for sheet material which is capable of spreading napped material or material having a one-way pattern on each traverse of the machine along the table or other surface on which it is mounted with this material being laid down in a manner admitting of in situ cutting of pieces therefrom in matched pairs.

Within the scope of the aforestated principal object, it is a particular object of this invention to provide a spreading machine for sheet material which includes means to accommodate a primary supply of sheet material in roll or other suitable form; sheet material withdrawing means adapted to withdraw sheet material positively from a properly accommodated primary supply thereof in each traversing movement of the frame or carriage of the machine over and along the surface upon which the sheet material is to be laid down; cutting means for severing sheet material which has been withdrawn from a properly accommodated supply thereof into successive segments; a pair of intermediate storage rolls each of which is adapted alternately with respect to the other to receive and temporarily accommodate a sheet segment withdrawn and cut from a properly accommodated primary supply of sheet material on one traverse of the carriage, and thereafter upon a subsequent traverse feed the resulting storage sheet segment to paying out means also included in the spreading machine and adapted to receive sheet segments directly from said withdrawing and cutting means on carriage traverses alternate with those on which it receives sheet segments from said intermediate storage rolls, there existing between the intermediate storage rolls as a pair and the means to accommodate a primary supply of sheet material the capability of relative end-for-end rotation in planes parallel to the plane of the surface upon which the sheet material is to be laid down.

Within the scope of the aforestated particular object, it is a more particular object of this invention to provide a spreading machine for sheet material in which said capability of relative end-for-end rotation between the intermediate storage rolls as a pair and the means to accommodate a primary supply of sheet material is achieved by having this means in the form of a hanger structure pivotably supported in and from the machine carriage.

Within the scope of the aforestated more particular object, it is a still more particular object of this invention to provide a spreading machine for sheet material in which said cutting means is supported from and capable of end-for-end rotation with said hanger structure.

These and other objects and advantages of this invention, as well as its nature and substance, will be more clearly perceived and fully understood by referring to the following description and claims taken in connection with the accompanying drawings in which:

Figure 1:
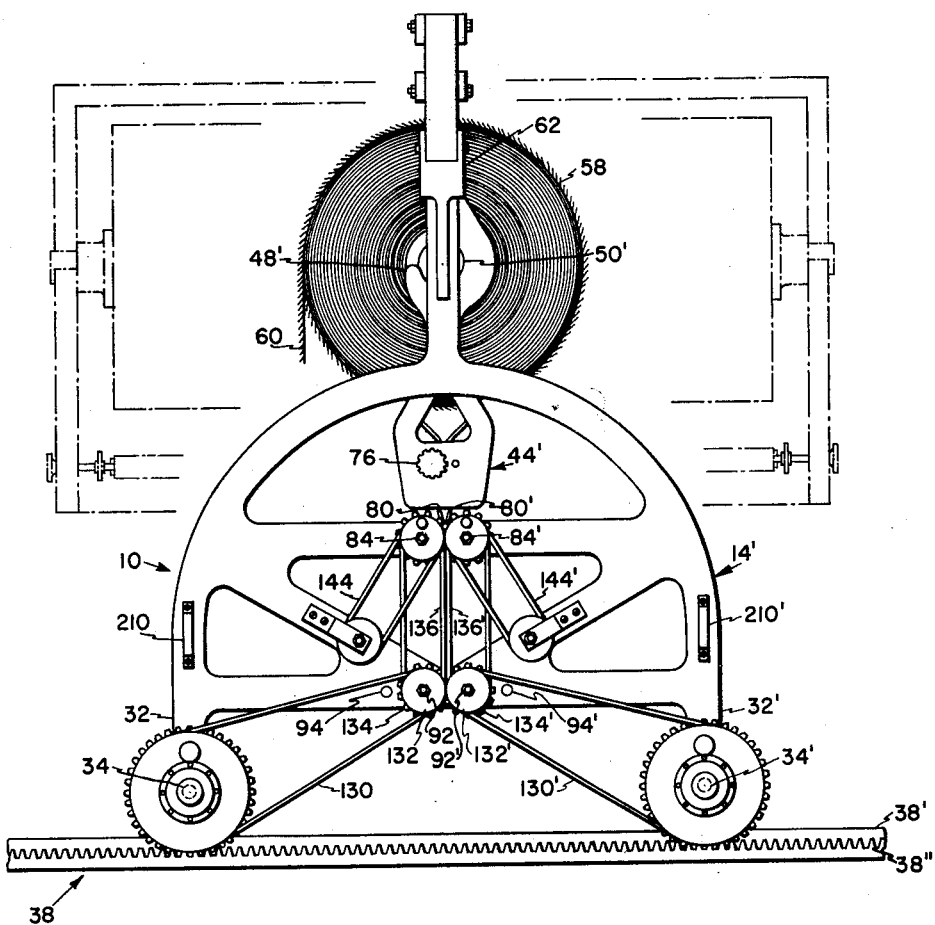
FIGURE 1 is a side elevation view of a sheet material spreading machine embodying features of this invention in a preferred order of arrangement, the machine being shown supported by a track-bearing cutting cable along which the machine travels in the course of spreading operations.
Figure 2:
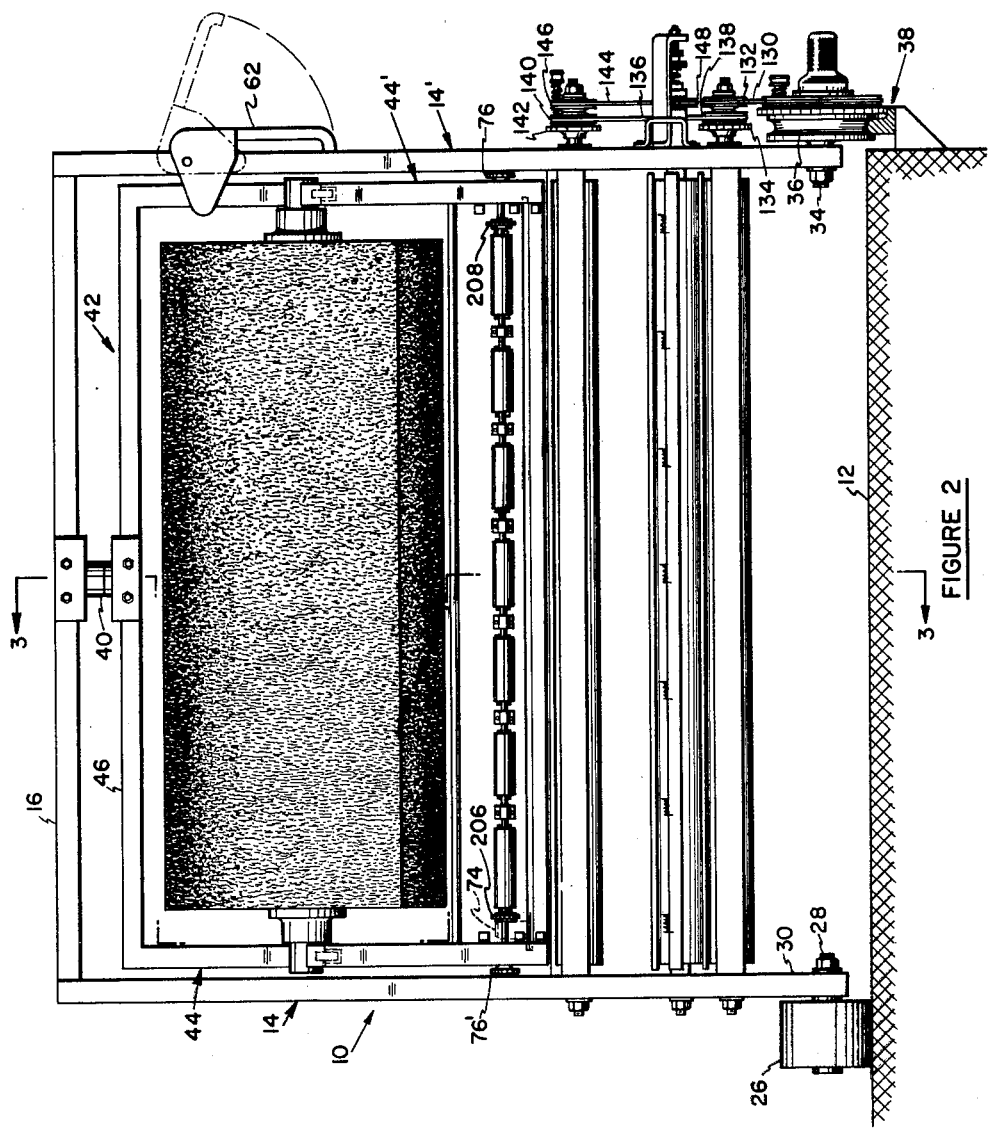
FIGURE 2 is an end elevation view of the machine of FIGURE 1 looking along the cutting table in one direction of machine traverse.

Referring now to FIGURES 1–4 inclusive, apparatus embodying features of this invention is shown to comprise a reciprocating carriage 10 adapted to travel over the surface of a track-bearing table 12. The carriage has a pair of side frames 14 and 14' of suitable design, these frames being rigidly spaced apart by an overhead cross-tie or brace 16 and four lower braces 18, 20, 22 and 24.

Side frame 14 is supported by two non-grooved or plain wheels 26 and 26' which rest upon the top surface of table 12. These wheels are rotatably mounted on stub shafts 28 and 28' which extend through and are fixedly fitted in legs 30 and 30' which form the lower portions of side frame 14. Side frame 14' is supported by grooved or flanged wheels 36 and 36' fixedly mounted on stub shafts 34 and 34' which extend through and are rotatably mounted in legs 32 and 32' which form the lower portions of side frame 14'. Grooved or flanged wheels 36 and 36' are supported by a track assembly 38 mounted on one side of table 12. Wheels 26, 26', 36, and 36' constitute the principal weight-carrying members of the machine. Wheels 36 and 36' each form a part of a drive assembly hereinafter described in detail with reference to FIGURES 5 and 6. Track assembly 38 comprises a rail 38' and a gear rack 38". The upper convex surface of the rail is shaped to fit the grooved or concave portions of wheels 36 and 36'.

Figure 3:
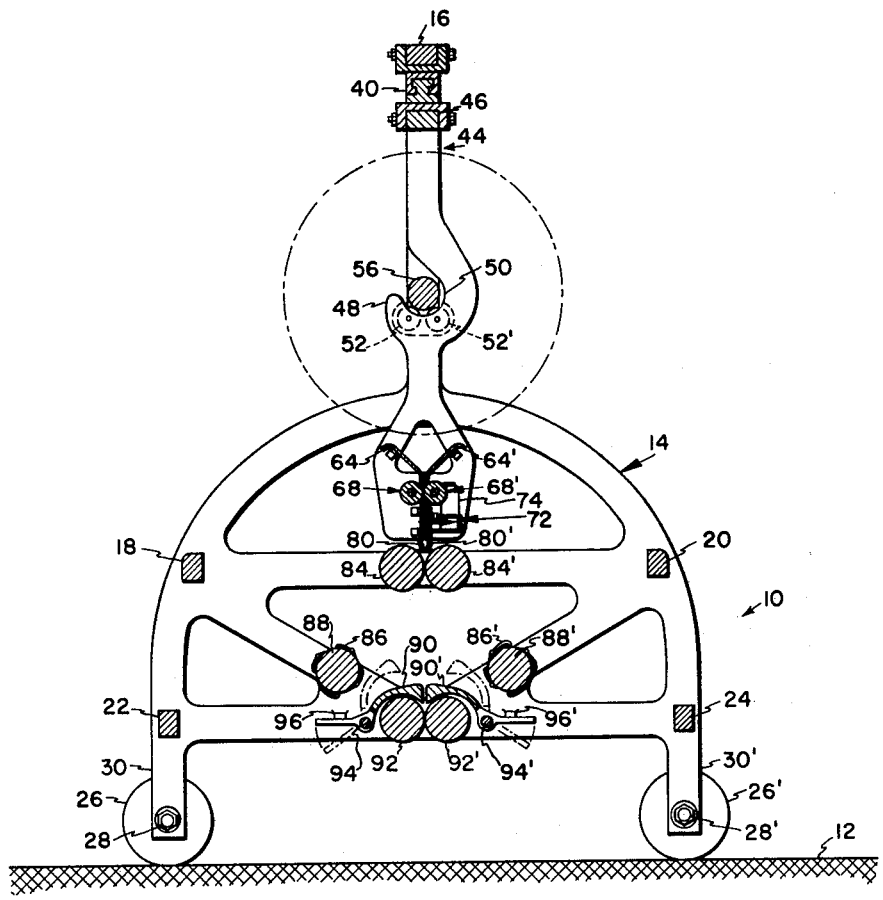
FIGURE 3 is a side elevation view in cross section of the machine of FIGURE 1 taken along line 3—3 in FIGURE 2 looking in the direction of the arrows.
Figure 4:
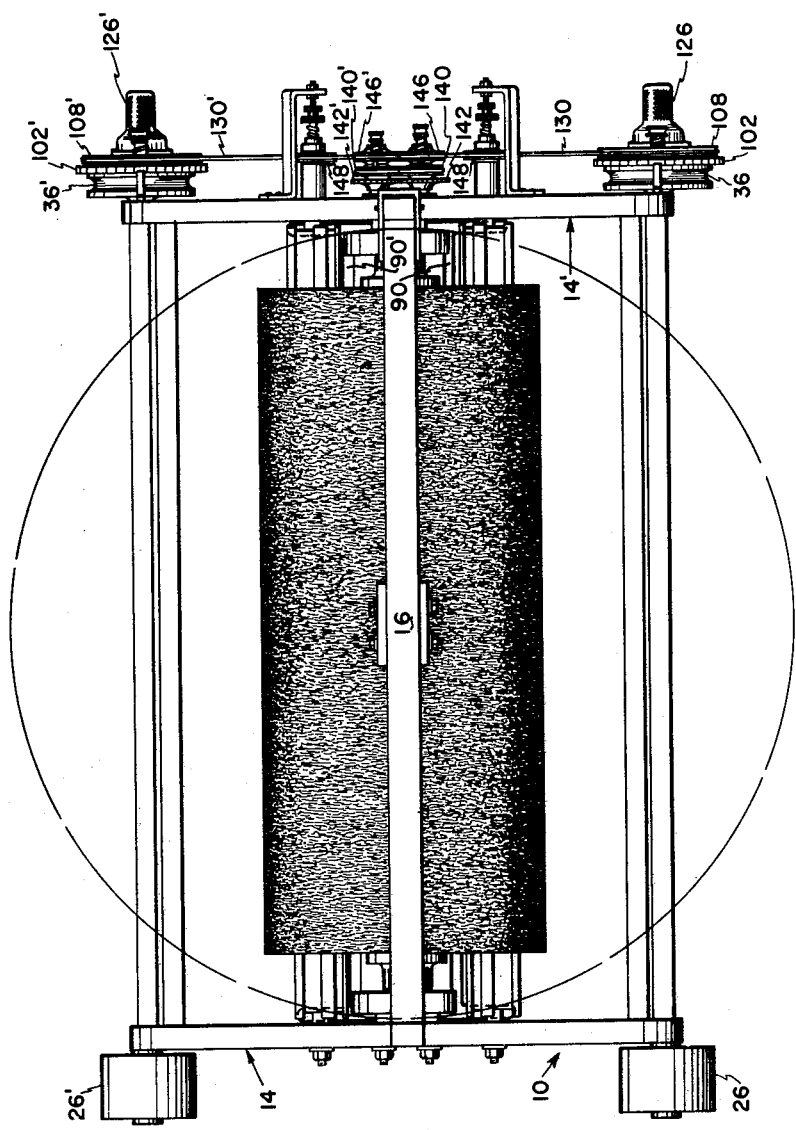
FIGURE 4 is a plan view of the machine shown in FIGURE 1.

Supported by cross-tie 16 through pivoting means 40 is a C-frame or hanger 42. Hanger 42 comprises two depending members or legs 44 and 44', and an upper cross member 46. Depending members or legs 44 and 44' include hook-like center portions 48 and 48' respectively which form recesses 50 and 50' respectively. Associated with each of these recesses are suitable bearing members. One pair of such bearing members 52 and 52' are shown in FIGURE 3. Resting upon these and other bearing members not shown and disposed to freely rotate thereon are the ends of a bar or rod 56. This rod supports a mother roll or primary supply 58 of fabric 60, or other continuous length of sheet material, to be fed from the mother roll to guiding, cutting, and paying out means hereinafter described in detail. Supported by and pivotable upon side frame 14' is a hanger alignment locking lever 62 which in lowered or locking position prevents rotation of hanger 42 and mother roll 58 about pivoting means 40, but which can itself be rotated upwardly or raised to permit rotation of hanger 42. Hanger 42, which serves as a means to accommodate the primary supply of sheet material, is rotated by the operator or operators at the end of each traverse of carriage 10. Locking lever 62 is weighted so as to remain normally in a locking position, and must be shifted and/or turned out of locking position by an operator.

Supported by and extending between the lower, broadened portions of hanger legs 44 and 44' are upper guide means 64 and 64', feeder roll assemblies 68 and 68', and a sheet cutting means or knife assembly 72. Associated with and supported by knife assembly 72 is cutting means driving motor 74. The ends of feeder roll assemblies 68 and 68' extend through hanger legs 44 and 44', and are provided with handles or turning knobs 76 and 76' respectively positioned on opposite sides of hanger 42 to facilitate the turning of these assemblies by an operator from either side of the carriage, the shaft elements of the feeder roll assemblies being geared together as pointed out in detail hereinafter.

Upper guide means 64 and 64', feeder roll assemblies 68 and 68', cutting means 72, and their relationship to each other are described hereinafter in detail with reference to FIGURES 10 and 11. In addition, their functions will be more fully understood from the description of the operational movements of the machine illustrated by FIGURES 12–17 inclusive. For the time being, it is sufficient that it be understood that upper guide means 64 and 64' facilitate the manual threading steps carried out by the operator in introducing fabric 60 to feeder roll assemblies 68 and 68', and thence to lower guide means 80 and 80', metering rolls 84 and 84', and either one of the two intermediate storage rolls 88 and 88', or delivering means here shown in the form of paying out or sheet releasing rolls 92 and 92'. In these steps fabric 60 is brought past cutting means 72 which is actuated by motor 74 near the end of each traverse of the machine to separate the sheet material being spread into successive segments.

Rolls 84, 84', 88, 88', 92 and 92' extend through and between and are supported in bearings by side frames 14 and 14'. Also extending between and supported by side frames 14 and 14' are lower guide means 80 and 80' which serve as functional extensions of upper guide means 64 and 64' respectively. Immediately below the lower guide means are metering rolls 84 and 84' whose surfaces receive and are capable of exerting a pull upon sheet material passing downwardly between lower guide means 80 and 80'. Metering rolls 84 and 84' are provided with gripping surfaces such as those of rubber sleeves fitted as external parts of these rolls to facilitate frictional engagement with fabric or other sheet material issuing from lower guide means 80 and 80'.

Located below and on either side of metering rolls 84 and 84' are intermediate storage rolls 88 and 88'. These rolls are adapted to receive alternate sheet segments issuing from the metering rolls; to store one such segment on one of them while another segment is being laid down upon table 12 after passing between sheet releasing rolls 92 and 92', and then to release the stored segment to rolls 92 and 92' for laying down during the next subsequent traverse of the machine while still another segment is being received for storage or temporary accommodation on and by the other of them. As here shown, rolls 88 and 88' are equipped with loading or sheet gripping means 86 and 86' comprising hinged, spring-biased strip members, one edge of each of which can be raised manually from the surface of the roll with which it is associated to receive an end portion of sheet material, and then returned by spring action to grip the sheet material between itself and the roll to facilitate winding of the material thereon.

Still lower and positioned directly below metering rolls 84 and 84' are the aforementioned paying out or sheet releasing rolls 92 and 92' which provide the last engagement of the machine with the sheet material being spread before the latter is released to the cutting table 12. Rolls 92 and 92' like rolls 84 and 84' are provided with gripping surfaces to obtain good frictional or pulling engagement with the material being spread. They are provided further with covering guides 90 and 90' rotatably mounted on rods 94 and 94' respectively, and retained or limited in lowered or guiding position by stops 96 and 96'.

Figure 5:
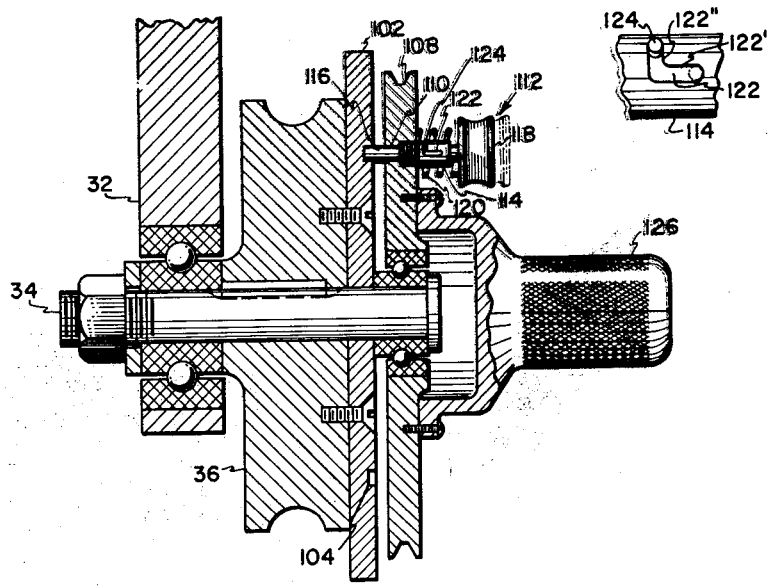
FIGURE 5 is an enlarged view in cross section of one of two lower or track-engaging drive assemblies of the machine in FIGURE 1 taken along line 5—5 in FIGURE 6 looking in the direction of the arrows.

Referring next to FIGURE 5, there is shown an enlarged view in cross section of one of the two track-engaging drive assemblies which are supported by and adapted to travel along track assembly 38. Among the machine items previously mentioned which appear in FIGURE 5 are grooved wheel 36, stub shaft 34, and side frame leg 32 in its lower extremity. Grooved wheel 36 is keyed or otherwise fixedly mounted on stub shaft 34, and on the side of grooved wheel 36 further removed from leg 32 there is a lower drive assembly gear 102. Gear 102 is rigidly fixed to wheel 36 by screws. Hence gear 102, wheel 36, and shaft 34 always turn together. The teeth of gear 102 are engaged at all times with the teeth of rack 38". In the side or face of gear 102 opposite wheel 36 there is a plurality of depressions or bottomed holes 104, the purpose of which is hereinafter explained. These may be through-going holes, if desired.

Rotatably mounted upon shaft 34 is lower drive assembly pulley or sheave 108 carrying plunger assembly 112. This assembly comprises a plunger housing 114 which is in threaded engagement with and seated in a counterbored portion of a hole or aperture 110 in sheave 108 at a radius equal to that of bottomed holes 104 in gear 102, a plunger shaft 116 slidably and rotatably disposed within the housing and having a diameter essentially equal to that of each of bottomed holes 104, a plunger knob 118 fixedly mounted on shaft 116, a plunger spring 120 surrounding housing 114 and held in compression between adjacent faces of sheave 108 and knob 118, and a plunger shaft pin 124 fixedly fitted in and extending radially outwardly from shaft 116, and adapted to move in L-shaped slot 122 in plunger housing 114. This slot appears in detail in a fragmented and enlarged auxiliary view of the plunger housing given in association with FIGURE 5.

As shown in FIGURE 5, plunger spring 120 has been compressed by leftward motion of shaft 116 and knob 118, and plunger pin 124 has ridden along horizontal extension 122' of slot 122 to a position therein allowing pin 124 to move upwardly into vertical extension 122" of slot 122 upon knob 118 having been rotated clockwise after the tip end of shaft 116 has entered one of the bottomed holes in gear 102. A release of hand pressure on knob 118 has allowed spring 120 to react against this knob so as to retain pin 124 in vertical extension 122" of slot 122, and shaft 116 in bottomed hole 104. Counterclockwise rotation of knob 118 lowering pin 124 would allow spring 120 to expand and effect disengagement or withdrawal of plunger shaft 116 from hole 104 in gear 102.

Fixedly attached to sheave 108 is a handle 126. This handle and its companion handle 126' on sheave 108' in the other track-engaging drive assembly facilitate the turning of these sheaves to effect feeding of sheet material 60 from mother roll 58 to either intermediate storage roll 88, intermediate storage roll 88', or the pair of paying out or sheet releasing rolls 92 and 92' for engagement therewith after this material has been engaged with and between metering rolls 84 and 84'. This turning and feeding action and the need therefor will be explained in greater detail and made more apparent when the operating relationships between the track-engaging drive assemblies on the one hand and the sheet releasing, metering, and intermediate storage rolls on the other are described hereinafter.

Figure 6:
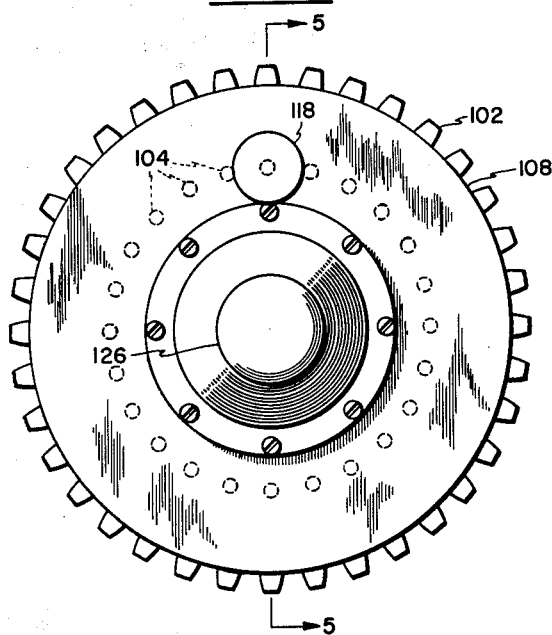
FIGURE 6 is a side elevation or face view of the drive assembly shown in FIGURE 5.

FIGURE 6 as aforementioned is a side elevation or face view of the track-engaging drive assembly shown in section in FIGURE 5. In FIGURE 6 there appears a representative distribution of bottomed, plunger shaft receiving holes 104 in broken outline, these holes being concealed from direct view by sheave 108.

Referring again to FIGURES 1-4, belts 130 and 130' for driving sheet releasing rolls 92 and 92' extend from pulleys 108 and 108' to outer pulleys 132 and 132' which are fixedly mounted on rolls 92 and 92'. Rolls 92 and 92' also have gears 134 and 134' fixedly mounted thereon, and these gears are meshed at all times to insure that the two sheet releasing rolls always turn together.

Belts 136 and 136' for driving metering rolls 84 and 84' extend from inner pulleys 138 and 138' (not shown) which are fixedly mounted on sheet releasing rolls 92 and 92' to inner pulleys 140 and 140' which are fixedly mounted on rolls 84 and 84'. Rolls 84 and 84' also have gears 142 and 142' fixedly mounted thereon, and these gears are meshed at all times to insure that the two metering rolls always turn together.

Belts 144 and 144' for driving intermediate storage rolls 88 and 88' extend from outer pulleys 146 and 146' which are mounted on metering rolls 84 and 84' to pulleys 148 and 148' which are mounted on rolls 88 and 88'. The nature of the mounting of pulleys 146 and 146' on rolls 84 and 84' and of pulleys 1148 and 148' on rolls 88 and 88' is explained in detail hereinafter with particular reference to FIGURES 7, 8 and 9.

Figure 7:
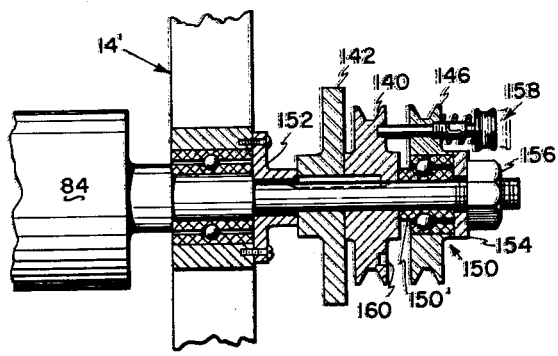
FIGURE 7 is an enlarged view in cross section of the portion of the upper or metering roll drive assembly particularly associated with one of the two metering or sheet withdrawing rolls of the machine of FIGURE 1 taken along line 7—7 in FIGURE 8 looking in the direction of the arrows.

Referring next to FIGURE 7, there is shown an enlarged view in cross section of one of the two upper or metering roll drive assemblies positioned at the ends of metering rolls 84 and 84' on one side of the machine. Among the machine items previously mentioned which appear in FIGURE 7 are metering roll 84, side frame 14', gear 142, inner pulley 140, and outer pulley 146. Gear 142 and inner pulley 140 are keyed or otherwise fixedly mounted on the end or journal portion of roll 84 which in turn is rotatably mounted in frame 14'. Gear 142 is spaced apart from side frame 14' by spacing collar 152 which is fixedly mounted upon frame 14', and within which roll 84 is freely rotatable.

Outer pulley 146 is rotatably mounted upon roll 84 by means of bearing assembly 150. This pulley is spaced apart from fixedly mounted inner pulley 140 by an extension of inner race 150' of bearing 150, and is secured on roll 84 by collar 154 and nut 156 which is in threaded engagement with the roll. Rotatably mounted outer pulley or drive sheave 146 is adapted for engagement with fixedly mounted inner pulley or drive sheave 140 through a spring-actuated plunger assembly 158 and bottomed holes 160. Although somewhat smaller in most particulars, plunger assembly 158 is constructed essentially similar to plunger assembly 112 shown in FIGURE 5. Engagement or clutching of outer pulley 146 with inner pulley 140 and through it with roll 84 via plunger assembly 158 and the corresponding disengagement or declutching of these pulleys are effected in identical manner to the corresponding engagement and disengagement of lower drive sheave or pulley 108 with and from gear 102. Outer pulley 146 mounted on roll 84 is engaged with inner pulley 140 in that movement or function of the machine wherein the positive drive of pulley 148 and through it of intermediate storage roll 88 via belt 144 is required. Correspondingly, outer pulley 146' mounted on roll 84' is engaged with the inner pulley on this roll when intermediate storage roll 88' is to be driven in like manner.

Figure 8:
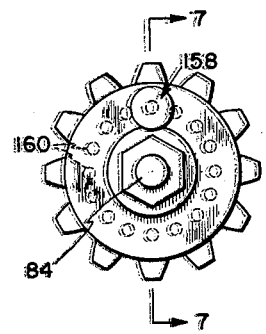
FIGURE 8 is a side elevation or face view of the metering roll drive assembly shown in FIGURE 7.

FIGURE 8 as aforementioned is a side elevation or face view of the metering roll drive assembly of FIGURE 7 showing a representative distribution of bottomed holes 160 in inner pulley 140 in broken outline, these holes being concealed from direct view by outer pulley 146.

Figure 9:
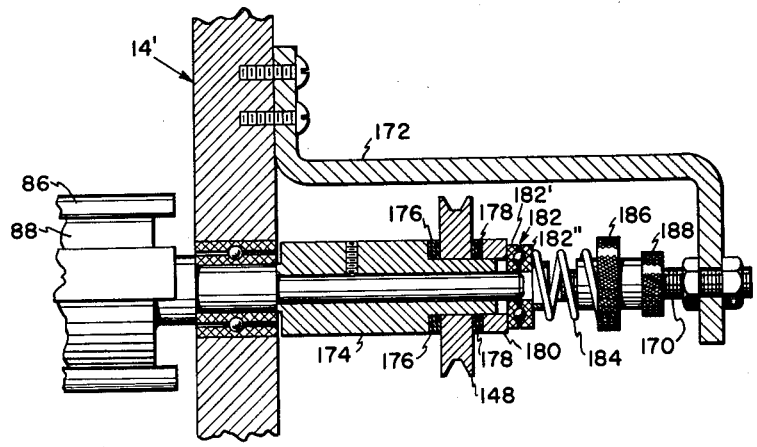
FIGURE 9 is an enlarged view in longitudinal cross section of one of the intermediate storage roll friction drive assemblies of the machine shown in FIGURES 1, 2, 3 and 4.

Referring next to FIGURE 9, there is shown an enlarged view in cross section of one of the two intermediate storage roll friction drive assemblies positioned at the ends of intermediate storage rolls 88 and 88' on one side of the machine. As hereinafter more fully explained, these friction drive assemblies provide means for maintaining essentially equal linear speeds for the surfaces of the metering rolls 84 and 84' on the one hand and surface created by sheet material being wound upon either of the intermediate storage rolls 88 or 88' on the other hand, when such material is being transferred from the metering rolls to one of the intermediate storage rolls.

Among the machine items previously mentioned which appear in FIGURE 9 are roll 88, pulley 148, and side frame 14'. One end or journal portion of intermediate storage roll 88 is supported by and rotatably mounted in side frame 14'. The illustrated friction drive assembly includes a threaded adjustment shaft 170 which is in screwed engagement with and supported by a bracket 172 which in turn is fixedly mounted on side frame 14' by screws or other conventional means. The end or journal portion of roll 88 which is supported by side frame 14' extends through the frame. On this end portion of roll 88, here shown to the right of side frame 14', is fixedly mounted sleeve 174. Rotatably and laterally slidably mounted on and supported by sleeve 174 is the aforementioned intermediate storage roll pulley or sheave 148. On the side of pulley 148 nearer to frame 14′ and supported by and shouldered against sleeve 174 is inner friction drive means 176, e.g. an array of leather washers. On the opposite side of pulley 148 and supported by and surrounding sleeve 174 is outer friction drive means 178 which may be of the same material as that employed in the construction of inner friction drive means 176.

In contact with outer friction drive means 178 and slidably mounted on sleeve 174 is a compression collar 180. Compression collar 180 in turn is in contact with the left hand race 182′ of a thrust bearing 182 which is positioned between the terminal portion of roll 88 and the aforementioned adjustment shaft 170 axially aligned therewith. The left hand race 182′ is slidably mounted on roll 88 while the right hand race 182″ is borne upon by spring means 184. Spring means 184 is mounted against and held in compression by adjusting nut 186. Adjusting nut 186 is mounted on and in threaded engagement with adjustment shaft 170. Also threaded onto shaft 170 and adapted to be moved into contact with adjusting nut 186 is locking nut 188 which provides means for securing the adjusting nut in position when the desired adjustment of the friction drive assembly has been effected.

In the embodiment of this machine shown in FIGURES 1–4, metering rolls 84 and 84′ and intermediate storage rolls 88 and 88′ are of equal diameter. They are in this embodiment connected by a drive system comprising the aforementioned pulley 146, 146′, 148 and 148′, and belts 144 and 144′ sized in a manner such that when intermediate storage rolls 88 and 88′ in bare condition are caused to turn in response to the movement of metering rolls 84 and 84′ the linear surface speeds of rolls 84, 84′, 88 and 88′ are essentially equal. The two friction drive assemblies, an exemplary one of which has been hereinbefore described with reference to FIGURE 9, are therefore provided so that when sheet material is being passed between rolls 84 and 84′ and wound up on either roll 88 or 88′ the angular speed of roll 88 or 88′ can be decreased in relation to that of rolls 84 and 84′ to compensate for the increase in the functional diameter of the active intermediate storage roll as sheet material is wound thereon to maintain the aforementioned equality of linear surface speeds without undue stressing of sheet material between the metering and intermediate storage rolls. This is effected through slippage of pulley 148 about sleeve 174 or the similar relative movement of corresponding parts associated with the friction drive of roll 88′ depending upon which of the two intermediate storage rolls is being loaded.

Slippage of pulley 148 about or around sleeve 174 is prevented by the spring force exerted against this pulley through outer friction drive means 178 until the tensile force placed upon the sheet material extending between roll 88 and the metering rolls 84 and 84′ generates sufficient resistance torque to overcome the forward or driving frictional torque exerted on rotatably mounted pulley 148 by drive means 176 and 178. The force exerted against pulley 148 through outer friction drive means 178, corresponding to which force the aforementioned driving frictional torque is either raised or lowered, is increased by turning adjusting nut 186 about threaded adjustment shaft 170 so as to bring nut 186 closer to roll 88. This presses spring 184 more firmly against thrust bearing 182 which exerts force upon compression collar 180 which in turn presses against outer friction drive means 178. Conversely the force exerted by outer friction drive means 178 against pulley 148 is decreased by loosening locking nut 188 and moving adjusting nut 186 to the right or outwardly along adjustment shaft 170. After either adjustment, locking nut 188 is moved into position against adjusting nut 186 to secure the latter in the desired position.

Figure 10:
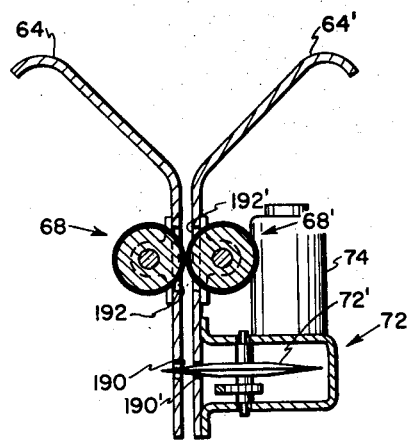
FIGURE 10 is a detailed and enlarged view of the threading assembly of the machine of this invention shown in FIGURE 3 showing the relationship of sheet guides, feeder rolls, and cutting means.
Figure 11:
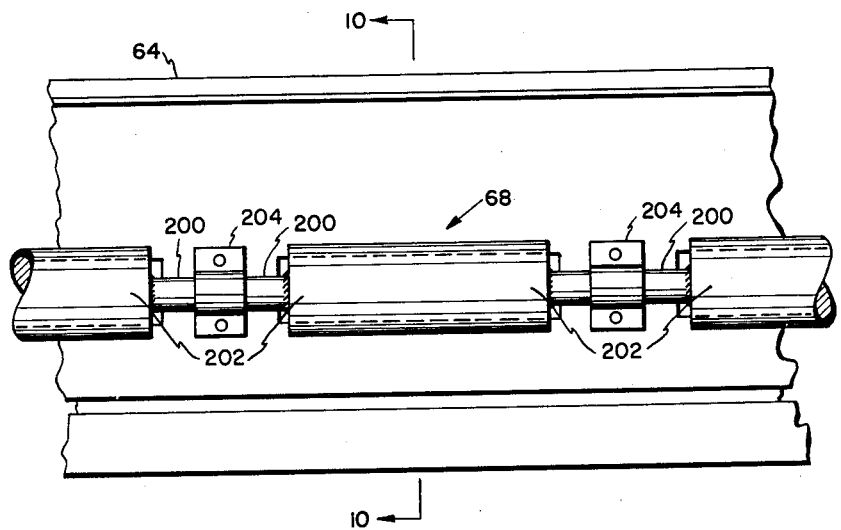
FIGURE 11 is an enlarged lengthwise view of a portion of the installation of one of the feeder rolls of the threading assembly shown in FIGURES 3 and 10, and FIGURES 12–17 inclusive illustrate in consecutive order the first six operational steps of travel and/or sheet spreading of and by the machine shown in the previous figures.

Referring next to FIGURES 10 and 11, there is shown in the first of these an enlarged transverse sectional view of the threading assembly through which sheet material 60 is drawn from mother roll 58, and thence fed to metering rolls 84 and 84′ which pass such material either directly to sheet releasing rolls 92 and 92′ or indirectly to these rolls via intermediate storage rolls 88 and 88′. FIGURE 11 shows a longitudinal view of a portion of feeder roll assembly 68.

Among the machine items previously mentioned which appear in FIGURE 10 are upper guide means 64 and 64′, feeder roll assemblies 68 and 68′, and cutting means 72. In the embodiment here shown, cutting means 72 comprises a circular knife 72′ adapted to spin around its own vertical axis and simultaneously reciprocate between hanger legs 44 and 44′ in a direction perpendicular to the direction of feed of sheet material passing between guide means 64 and 64′. The drive assembly for cutting means 72 can comprise a conventional chain driving means, not shown, on which knife 72′ is mounted or with which knife 72′ is otherwise engaged. This chain driving means can be power driven by motor 74 with which it is connected or engaged by conventional means. The desired spinning motion can be imparted to knife 72′ by mounting a suitable gear on the shaft of knife 72′ and providing a rack assembly in parallel relationship to the chain driving means so that such gear is in engagement with such rack as the chain driving means causes knife 72′ to move back and forth from a point beyond one edge of the sheet material to a point beyond the opposite edge of the same.

As shown, the cutting edge of knife 72′ extends through slots 190 and 190′ in guide means 64 and 64′. It is necessary for knife 72′ to pass beyond the edge of the sheet material to prevent the knife from obstructing the next feeding step when sheet material is passed between upper guide means 64 and 64′ and feeder roll assemblies 68 and 68′. Energization of motor 74 to cause knife wheel 72′ to spin and make a cutting stroke may be effected by either manual or automatic switching near the end of any traverse of the spreading machine of this invention along table 12. Electric power may be brought to knife motor 74 through sliding contacts in or on pivot means 40 from whence an electrical cable or conduit can extend outwardly along the cross piece or horizontal element of the rotatable mother roll hanger 42, then downwardly along one of the hanger legs, and finally inwardly to the motor.

It is to be understood that cutting means of the type above described are well known in the art, and that the construction and cutting operation of the same do not of themselves constitute a part of this invention. Other types of cutting means can be utilized so long as they do not interfere with the overall operation of this machine, and in a rudimentary version of the spreading operation herein disclosed the sheet material can be severed into segments by a simple manual cutting step. The novelty of the illustrated machine with regard to its cutting means and/or cutting step is provided by the positioning of the cutting means so as to be pivotable with hanger 42 and/or the arrangement of the cutting means in cooperative combination with other components of the machine.

Feeder roll assemblies 68 and 68′ extend through slots 192 and 192′ in upper guide means 64 and 64′ so as to grip and frictionally engage sheet material passing downwardly between these guide means. In the detailed longitudinal view of feeder roll assembly 68 shown in FIGURE 11 it is to be seen that this assembly comprises a shaft 200, a plurality of roll elements 202, and a plurality of support brackets 204 which are fixedly mounted on upper guide means 64. Shaft 200 and roll elements 202 are thus supported by brackets 204 within which shaft 200 is rotated when sheet material is passed between feeder roll assemblies 68 and 68′. Also carried on shaft 200 are gears 206 and 208 indicated in FIGURE 2 which pass through slots in guide means 64 to mesh with corresponding gears on feeder roll assembly 68′.

Referring finally to FIGURES 12–17 inclusive, the functions of the aforedescribed machine components are illustrated as these components are employed in the first six operational steps of travel and/or sheet spreading by the machine of this invention. As shown in FIGURE 1, the machine is equipped with hand grips 210 and 210' mounted on opposite ends of side frame 14' for the operator's use in pushing and/or pulling the machine back and forth along table 12.

In FIGURE 12 showing the first carriage movement, the basic machine components hereinbefore described are shown as they appear near the end of the first traverse of the machine along the table, a traverse in which a segment of sheet material is wound up on intermediate storage roll 88' for subsequent spreading, but in which no sheet material is actually laid upon the table. Prior to its movement illustrated in FIGURE 12, the machine has been loaded by mounting mother roll 58 in spreading or unwinding position on and between the legs of hanger 42 previously described with reference to FIGURES 1–4, and attaching the free end of fabric 60 to storage roll 88' after the requisite preliminary threading. This threading is effected by passing the free end of fabric 60 between upper guide means 64 and 64' until contact is made with feeder roll assemblies 68 and 68'. By turning knob 76 or 76', the feeder roll assemblies which are geared together engage fabric 60 and pass the same down through the passageway between upper guide means 64 and 64', and thence between lower guide means 80 and 80' and into engagement with metering rolls 84 and 84'.

By causing metering rolls 84 and 84' to turn through action of the drive assemblies hereinbefore described on account of rotation of sheave 108 by means of handle 126, cloth or fabric 60 is passed a sufficient distance between rolls 84 and 84' to admit of engagement with intermediate storage roll 88' via gripping means 86. This requires disengagement of sheave 108 from gear 102 through withdrawal of plunger shaft 116 from any one of the plurality of bottomed holes 104 in which it may be seated or engaged, and also corresponding disengagement of sheave 108' from gear 102'. In FIGURE 12 the movement of the machine is to the right as viewed facing the drive assemblies of the machine. Hence, after the aforedescribed threading operation, lower drive assembly sheave 108 is engaged with gear 102 via shaft 116 of plunger assembly 112 seating in the appropriate one of the plurality of holes 104 while sheave 108' remains disengaged from gear 102'. Likewise, outer sheave 146' is engaged via plunger assembly 158' with inner sheave 140' which is fixedly mounted on metering roll 84'. Outer sheave 146 is preferably although not necessarily disengaged from inner sheave 140. As shown in FIGURE 12, cutting means 72 has not been actuated, and the end of cloth 60 wound on intermediate storage roll 88' is still connected with mother roll 58.

Near the end of the machine movement illustrated in FIGURE 12, cutting means 72 is actuated as hereinbefore described severing the sheet segment wound about roll 88' from the mother roll. Desirably although not necessarily, the motion of carriage 10 and hence the feeding or unwinding of sheet material from mother roll 58 is stopped momentarily for the cutting operation so that the sheet material will be cut off altogether squarely. Knife element 72' itself is, of course, stopped in a position beyond the path provided for sheet material to pass between upper guide means 64 and 64' enroute to metering rolls 84 and 84'. The movement of the machine illustrated in FIGURE 12 continues for a distance sufficient to allow the severed end of the sheet segment wound about intermediate storage roll 88' to be passed between and out of engagement with metering rolls 84 and 84', and pulled over substantially onto roll 88'.

Prior to the initiation of the next movement of the machine carriage along the table, locking lever 62 is raised to allow a half turn or end-for-end rotation of hanger 42 and the mother roll accommodated therein and thereon about pivoting means 40. The locking lever is then let fall or lowered, and sheet material 60 from the mother roll is again fed to and gripped by metering rolls 84 and 84' in the same manner as hereinbefore described for this step prior to the movement illustrated in FIGURE 12, except that the severed end of fabric 60 attached to mother roll 58 remains gripped by feeder roll assemblies 68 and 68' which are pivotable with the mother roll. The steps of turning the mother roll end for end and feeding sheet material to the metering rolls are both repeated between successive traverses of the machine, while the cutting step wherein a sheet segment is severed from the mother roll is repeated near the end of each traverse.

In FIGURE 13 showing the second carriage movement, the first spreading traverse is illustrated. This shows the machine moving to the left after the completion of the rightward traverse illustrated in FIGURE 12. During the second carriage movement, roll 88' retains the fabric segment wound thereon in the previous traverse while cloth is being laid upon table 12 after passing directly from metering rolls 84 and 84' to sheet releasing rolls 92 and 92' between which it passes before being spread upon the table, and by which its leading end or edge is gripped prior to the start of the second carriage movement just as it was gripped on or by intermediate storage roll 88' prior to the start of the first carriage movement. Covering guides 90 and 90' are rotated up from and clear of rolls 92 and 92' as necessary initially to permit and assist this gripping or fabric engagement. The pairs of rolls 84 and 84' on the one hand and 92 and 92' on the other are so sized and driven to have essentially equal linear surface speeds from pair to pair.

In the second machine traverse or carriage movement, the lower drive assembly sheave actions with respect to engagement or disengagement with the gears behind them are reversed from those hereinbefore described for the traverse illustrated in FIGURE 12. The outer sheaves of both metering roll drive assemblies are preferably disengaged from the inner sheaves behind them.

In FIGURE 14 showing the third carriage movement, the machine is again moving to the right as in FIGURE 12, and the cloth segment wound about intermediate storage roll 88' in the traverse shown in FIGURE 12 is now being spread atop the segment of cloth laid down in the second carriage movement shown in FIGURE 13. At the same time, cloth from mother roll 58 is being wound about intermediate storage roll 88 for spreading on a subsequent traverse. In the movement illustrated in FIGURE 14 the plunger shaft and sheave engagements and disengagements of the lower drive assemblies are the same as for the first movement illustrated in FIGURE 12. Metering roll drive assembly outer pulley 146 is here engaged with inner pulley 140 and roll 84, but outer pulley 146' is disengaged from inner pulley 140' so as to prevent interference with free rotation of intermediate storage roll 88' for the unwinding and release of cloth therefrom.

In FIGURE 15 showing the fourth carriage movement, the machine is moving to the left, and cloth is being laid down directly from the mother roll as in FIGURE 13. All drive assembly plunger shaft and sheave engagements employed in the fourth traverse or carriage movement are the same as those employed in the second carriage movement.

In FIGURE 16 showing the fifth carriage movement, the cloth segment wound about intermediate storage roll 88 in the third movement illustrated in FIGURE 14 is being spread, while cloth is again being intermediately wound up or stored on roll 88' as in FIGURE 12. Drive assembly sheaves 108 and 146' are engaged in this fifth movement while sheaves 108' and 146 are disengaged.

In FIGURE 17 showing the sixth carriage movement, there appears a repetition of the second carriage movement illustrated in FIGURE 13, a cycle of movements having thus been completed with the fifth carriage movement. The next subsequent or seventh traverse of the machine would correspond to the third carriage movement illustrated in FIGURE 14. The first carriage movement shown in FIGURE 12 during the course of which no fabric is laid down may be considered unique; that is, it is not repeated cyclically.

Attention should be directed to the arrangement of cloth layers or segments as disposed upon table 12 in FIGURES 13–17 with particular reference being given to the orientations of the napped surfaces of these layers. It is to be noted that succeeding segment pairs have been so laid that the napped surfaces of the individual segments thereof are facing each other with the predominant direction of nap on each of the facing segments oriented toward the same end of the table upon which the segments are spread. This admits of in situ cutting therefrom of matched pairs of garment parts or other fabric items or pieces.

In the illustrated machine, the three paths of fabric travel from the tangent point of the metering rolls to the tangent point of the sheet releasing rolls and the fabric engagement points on the two intermediate storage rolls should be of substantially equal length. This is to cause substantially equal lengths of fabric or sheet material to be paid out on each traverse of the machine for substantially equal lengths of machine travel along table 12.

Although an apparatus embodiment of this invention has been illustrated and described with a certain degree of particularity, it is to be understood that at least some changes in the details of the construction and the combination and arrangement of parts may be resorted to without departing from the spirit and scope of this invention as hereinafter claimed.

For one example, it is within the contemplation of this invention that an electric motor be provided to propel the illustrated machine back and forth along table 12, this motor being mounted on carriage 10 and engaged through a pinion on its output shaft with either gear 102 or 102' of the lower drive assemblies.

For another example, it is within the contemplation of this invention that adjustable starting and stopping indicia be provided on the machine or on table 12 or on both as most convenient to determine the terminal points of motion of the machine for spreading purposes, particularly the effective starting points of its traverses, as successive fabric layers or sheet segments are spread on the table in an increasing height of layers or segments, this provision being for the purpose of achieving accurate end alignment of such layers or segments.

For another example, it is within the contemplation of this invention that besides being provided with a mounting on which it can be rotated end-for-end, hanger 42 be provided with a mounting on which it can be swung out and lowered with respect to carriage 10 to come down fairly close to table 12, this provision being for the purpose of reducing the height to which a fresh mother roll of sheet material 60 must be raised in order to be loaded onto the hanger.

For another example, it is within the contemplation of this invention that the intermediate storage rolls 88 and 88' as a pair be provided with a mounting on which they can be rotated end-for-end in a plane parallel to the surface of table 12 while hanger 42 may be rendered non-rotatable with respect to carriage 10.

Protection by Letters Patent of this invention as the same is defined in the appended claims is sought to the fullest extent that the prior art allows.

I claim as my invention:

1. A machine for spreading fabric-like sheet materials in successive superimposed layers upon a plane surface, said machine comprising (1) a carriage adapted to perform reciprocating movement over and along the surface upon which sheet material is to be laid down, (2) accommodation means mounted on said carriage for a primary supply of longitudinally extensive sheet material, (3) paying out means mounted on said carriage for transferring and releasing sheet material from said machine to said surface, (4) a first intermediate storage means and a second intermediate storage means each adapted to receive and temporarily accommodate sheet material in transit between a properly accommodated primary supply thereof and said paying out means, there existing between said first and second intermediate storage means and said accommodation means for a primary supply of sheet material the capability of relative end-for-end rotation in respect of the width dimension of sheet material temporarily accommodated by either of said intermediate storage means and that of sheet material in a properly accommodated primary supply thereof, and (5) drive mechanism mounted on said carriage wherethrough said first and second intermediate storage means may be actuated alternately by motion of said carriage over and along said surface to receive sheet material from a properly accommodated primary supply thereof on successive traversing movements of said carriage in one direction along said surface, and wherethrough further said paying out means may be actuated by motion of said carriage over and along said surface to receive and release sheet material substantially directly from a properly accommodated primary supply thereof on every traversing movement of said carriage in said one direction along said surface and from said first and second intermediate storage means alternately on successive traversing movements of said carriage in the other direction along said surface.

2. A machine according to claim 1 in which said accommodation means for a primary supply of sheet material is pivotably mounted on said carriage for achievement of said relative end-for-end rotation.

3. A machine according to claim 2 which further comprises cutting means for severing sheet material in transit between a properly accommodated primary supply thereof and said surface into successive segments, said cutting means being pivotably mounted on said carriage to rotate end-for-end with said accommodation means for a primary supply of sheet material.

4. A machine according to claim 1 which further comprises guide means mounted on said carriage wherethrough feeding of sheet material from a properly accommodated primary supply thereof is facilitated to said paying out means substantially directly on every traversing movement of said carriage in one direction along said surface and to said first and second intermediate storage means alternately on successive traversing movements of said carriage in the other direction along said surface.

5. A machine for spreading fabric-like sheet materials in successive superimposed layers upon a plane surface, said machine comprising (1) a carriage adapted to perform reciprocating movement over and along the surface upon which sheet material is to be laid down, (2) accommodation means mounted on said carriage for a primary supply of longitudinally extensive sheet material, (3) paying out means mounted on said carriage for transferring and releasing sheet material from said machine to said surface, (4) withdrawing means mounted on said carriage for positively withdrawing sheet material from a properly accommodated supply thereof in each traversing movement of said carriage over and along said surface, said withdrawing means being adapted to feed sheet material directly to said paying out means on alternate traversing movements of said carriage, (5) cutting means mounted on said carriage for severing sheet material which has been withdrawn from a properly accommodated supply thereof into successive segments, and (6) first and second intermediate storage rolls mounted on said carriage, each of said rolls being adapted alternately with respect to the other to receive and temporarily accommodate a sheet segment withdrawn and cut from a properly accommodated primary supply of sheet material on one traversing movement of said carriage, and thereafter upon a subsequent traversing movement feed the resulting stored segments to said paying out means which is adapted to receive sheet material from said intermediate storage rolls on traversing movements of said carriage alternate with those on which sheet material is fed to it directly from said withdrawing means, there existing between said first and second intermediate storage rolls and said accommodation means for a primary supply of sheet material the capability of relative end-for-end rotation in respect of the width dimension of sheet material temporarily accommodated by either of said intermediate storage rolls and that of sheet material in a properly accommodated primary supply thereof.

6. A machine for spreading fabric-like sheet materials upon a plane surface in successive superimposed layers which admit of in situ cutting therefrom of pieces of napped material in matched pairs, said machine comprising (1) a carriage adapted to perform reciprocating movement over and along said surface, (2) accommodation means pivotally mounted on said carriage for a primary supply of longitudinally extensive sheet material in roll form, said accommodation means being adapted to rotate about an axis essentially normal to the plane of said surface and to so retain a roll of sheet material that the axis thereof is essentially parallel to the plane of said surface, (3) paying out means mounted on said carriage for transferring and releasing sheet material from said machine to said surface, (4) first and second intermediate storage being adapted to receive and temporarily accommodate means mounted on said carriage, each of said means being adapted to receive and temporarily accommodate sheet material in transit between a properly accommodated primary supply thereof and said paying out means, (5) cutting means mounted on said carriage for severing sheet material which has been withdrawn from a properly accommodated primary supply thereof into successive segments, (6) withdrawing means mounted on said carriage for positively withdrawing sheet material from a properly accommodated primary supply thereof, and feeding sheet material segments to said first intermediate storage means, said paying out means, and said second intermediate storage means; said first intermediate storage means being adapted to receive a first sheet material segment fed to it from said withdrawing means in the course of a first traversing movement of said carriage over and along said surface in a first direction, to retain this segment during a first traversing movement of said carriage in a second direction while a second sheet material segment reversed end-for-end in respect of its width direction with regard to said first sheet segment is fed directly from said withdrawing means to said paying out means and thence to said surface, and to feed said first sheet segment to said paying out means for transfer onto said second sheet segment in the course of a second traversing movement of said carriage in said first direction, and said second intermediate storage means being adapted to receive a third sheet material segment of end-to-end widthwise orientation similar to that of said first sheet segment fed to it from said withdrawing means in the course of said second traversing movement of said carriage in said first direction, to retain this segment during a second traversing movement of said carriage in said second direction while a fourth sheet segment of end-to-end widthwise orientation similar to that of said second sheet segment is fed directly from said withdrawing means to said paying out means and thence onto said first sheet segment, and to feed said third sheet segment to said paying out means for transfer onto said fourth sheet segment in the course of a third traversing movement of said machine in said first direction while a fifth sheet segment of end-to-end widthwise orientation similar to that of said third sheet segment is fed from said withdrawing means to said first intermediate storage means.

7. A machine according to claim 6 in which said cutting means is pivotably mounted on said carriage to rotate with said accommodation means for a primary supply of sheet material.

8. A machine according to claim 6 which further comprises a drive mechanism which is adapted in the course of and on account of the traversing movements of said carriage over and along said surface to actuate said paying out means and said withdrawing means in all traversing movements, said first intermediate storage means in the first traversing movement and every fourth traversing movement thereafter, and said second intermediate storage means in the third traversing movement and every fourth traversing movement thereafter.

9. A machine according to claim 6 in which said accommodation means for a primary supply of sheet material comprises a hanger including an upper cross member and a depending leg member at either end of said upper cross member, said leg members being adapted to support a primary supply of sheet material in roll form at an axial elevation intermediate the elevations of their upper and lower ends, and in which machine said cutting means is immediately mounted on and between said leg members at the lower ends thereof, and which machine further comprises guiding and feeding means for sheet material mounted on and between said leg members just above said cutting means and below the axial elevation of a properly accommodated roll of sheet material, said guiding and feeding means being adapted to receive an end portion of sheet material unwound from a properly accommodated primary supply thereof, and positively direct the same into said cutting means.

References Cited in the file of this patent

UNITED STATES PATENTS

| | | |
|---|---|---|
| 2,291,351 | Scoles et al. | July 28, 1942 |
| 2,973,157 | Korsch et al. | Feb. 28, 1961 |
| 3,094,319 | Deichmann | June 18, 1963 |

UNITED STATES PATENT OFFICE
CERTIFICATE OF CORRECTION

Patent No. 3,145,989                                                   August 25, 1964

George Cavrich

It is hereby certified that error appears in the above numbered patent requiring correction and that the said Letters Patent should read as corrected below.

Column 2, line 11, for "storage" read -- stored --; column 3, line 11, for "figures" read -- FIGURES --; line 62, for "shifted" read -- lifted --; column 6, line 6, for "1148" read -- 148 --; column 13, line 1, after "stored" insert -- sheet --; same column 13, line 29, strike out "being adapted to receive and temporarily accommodate".

Signed and sealed this 8th day of December 1964.

(SEAL)
Attest:

ERNEST W. SWIDER                                    EDWARD J. BRENNER
Attesting Officer                                          Commissioner of Patents